United States Patent
Chang (10) Patent No.: US 10,369,743 B2
(45) Date of Patent: Aug. 6, 2019

(54) COLOR OR MULTI-MATERIAL THREE-DIMENSIONAL (3D) PRINTING

(71) Applicant: San Draw Inc., San Jose, CA (US)

(72) Inventor: Kai-Jui Chang, Stanford, CA (US)

(73) Assignee: San Draw Inc., El Cerrito, CA (US)

( * ) Notice: Subject to any disclaimer, the term of this patent is extended or adjusted under 35 U.S.C. 154(b) by 668 days.

(21) Appl. No.: 14/534,998

(22) Filed: Nov. 6, 2014

(65) Prior Publication Data
US 2015/0142159 A1    May 21, 2015

Related U.S. Application Data

(60) Provisional application No. 61/962,869, filed on Nov. 18, 2013, provisional application No. 62/041,105, filed on Aug. 24, 2014.

(51) Int. Cl.
| | | |
|---|---|---|
| *B29C 64/147* | (2017.01) | |
| *B29C 67/00* | (2017.01) | |
| *B29C 64/106* | (2017.01) | |
| *B29C 64/112* | (2017.01) | |
| *B29C 64/124* | (2017.01) | |
| *B29C 64/386* | (2017.01) | |
| *B33Y 50/02* | (2015.01) | |
| *B33Y 10/00* | (2015.01) | |
| *B33Y 30/00* | (2015.01) | |

(52) U.S. Cl.
CPC ......... *B29C 64/147* (2017.08); *B29C 64/106* (2017.08); *B29C 64/112* (2017.08); *B29C 64/124* (2017.08); *B29C 64/386* (2017.08); *B29C 67/0007* (2013.01); *B33Y 10/00* (2014.12); *B33Y 30/00* (2014.12); *B33Y 50/02* (2014.12)

(58) Field of Classification Search
CPC ............ B29C 67/0062; B29C 67/0007; B29C 67/0055; B29C 67/0059; B29C 67/0088; G05B 15/02; B33Y 10/00; B33Y 30/00; B33Y 50/02
See application file for complete search history.

(56) References Cited

U.S. PATENT DOCUMENTS

| | | | |
|---|---|---|---|
| 5,121,329 A | 6/1992 | Crump | |
| 6,129,872 A | 10/2000 | Jang | |
| | (Continued) | | |

FOREIGN PATENT DOCUMENTS

| | | |
|---|---|---|
| CN | 103302859 | 9/2013 |
| JP | 01-232024 | 9/1989 |
| | (Continued) | |

OTHER PUBLICATIONS

Co-pending U.S. Appl. No. 15/604,598, filed May 24, 2017.
(Continued)

*Primary Examiner* — Jacob T Minskey
*Assistant Examiner* — Melody Tsui
(74) *Attorney, Agent, or Firm* — Wilson Sonsini Goodrich & Rosati (57) ABSTRACT

A three-dimensional (3D) continuous color printer includes one or more cartridges each with a building material stored therein, a mixer coupled to each cartridge, and a single printhead coupled to a mixer output, wherein the building material stored in the cartridge is transported to the mixer and the single print head to form a continuous color object.

21 Claims, 7 Drawing Sheets

(56) References Cited

U.S. PATENT DOCUMENTS

| | | | |
|---|---|---|---|
| 6,165,406 | A | 12/2000 | Jang et al. |
| 6,401,002 | B1 | 6/2002 | Jang et al. |
| 6,454,972 | B1 | 9/2002 | Morisette et al. |
| 6,713,125 | B1 | 3/2004 | Sherwood et al. |
| 7,648,664 | B2 | 1/2010 | Teal et al. |
| 9,688,022 | B2 | 6/2017 | Chang |
| 2002/0111707 | A1 | 8/2002 | Li et al. |
| 2004/0251574 | A1 | 12/2004 | Collins et al. |
| 2010/0007692 | A1* | 1/2010 | Vanmaele ............ B41C 1/003 347/21 |
| 2010/0140852 | A1 | 6/2010 | Kritchman et al. |
| 2010/0327479 | A1 | 12/2010 | Zinniel et al. |
| 2013/0209600 | A1* | 8/2013 | Tow ............... G01N 35/1011 425/375 |
| 2013/0328228 | A1 | 12/2013 | Pettis et al. |
| 2014/0079841 | A1* | 3/2014 | Pridoehl ............ B29B 7/94 425/375 |
| 2014/0134334 | A1 | 5/2014 | Pridoehl |
| 2014/0284832 | A1 | 9/2014 | Novikov et al. |
| 2015/0035198 | A1* | 2/2015 | Saba ............... B33Y 10/00 264/211.12 |
| 2015/0375451 | A1 | 12/2015 | Voris et al. |
| 2016/0009029 | A1 | 1/2016 | Cohen et al. |
| 2017/0043533 | A1 | 2/2017 | Chang |
| 2017/0355134 | A1 | 12/2017 | Chang |

FOREIGN PATENT DOCUMENTS

| | | |
|---|---|---|
| JP | H01232024 A | 9/1989 |
| JP | 2003519022 A | 6/2003 |
| WO | WO-0126023 A1 | 4/2001 |
| WO | WO-2008077850 A2 | 7/2008 |
| WO | WO-2008077850 A3 | 10/2008 |
| WO | WO-2009139395 A1 | 11/2009 |
| WO | WO-2012152511 A1 | 11/2012 |
| WO | WO-2015073301 A1 | 5/2015 |
| WO | WO-2017156415 A1 | 9/2017 |

OTHER PUBLICATIONS

Extended European search report and opinion dated Jun. 29, 2017 for EP Application No. 14861922.
International search report and written opinion dated Apr. 25, 2015 for PCT Application No. PCT/US2014/064393.
International search report and written opinion dated Jul. 31, 2017 for PCT Application No. PCT/US2017/021829.
Notice of allowance dated Apr. 28, 2017 for U.S. Appl. No. 15/337,344.
Office action dated Mar. 9, 2017 for U.S. Appl. No. 15/337,344.
Co-pending U.S. Appl. No. 16/120,092, filed Aug. 31, 2018.
U.S. Appl. No. 15/604,598 Office Action dated Oct. 22, 2018.
International search report and written opinion dated Apr. 29, 2015 for PCT Application No. US-2014064393.
U.S. Appl. No. 15/604,598 Notice of Allowance dated Jan. 17, 2019.

* cited by examiner

COLOR OR MULTI-MATERIAL THREE-DIMENSIONAL (3D) PRINTING

This application claims priority to Provisional Application No. 61/962,869 filed Nov. 18, 2013 and Provisional Application No. 62/041,105 filed Aug. 24, 2014, the contents of which are incorporated by reference.

BACKGROUND

The present invention relates to 3D color printing.

Rapid prototyping or rapid manufacturing processes are manufacturing processes which aim to convert available three-dimensional CAD data directly and rapidly into workpieces, as far as possible without manual intervention or use of molds. Most printers are single color printers, but following the trends in printing, consumers will demand high quality and affordable color printing.

A challenge faced in color 3D printing nowadays is the building material used. In the common design of a low-cost thermoplastic 3D printer, only a single heat extruder is used to provide energy for the melting, and some modifications are made in possible solutions. Multi-extruder 3D printers are available, but provides unrealistic output because the melted plastic cools down as soon as it touches the supporting bed and gets solidified. These multi-extruder 3D printers cannot mix solidified droplets to get a continuous full color object as each droplet is too large (much larger than the size of ink droplets in a desktop inkjet printer). Some color 3D printers also try to mix materials in color before extruding them, but it is hard to mix melted thermoplastics, the common building material, of different colors to a great extent since they melt at above 200 degree Celsius and cool rapidly if not insulated.

Conventional rapid prototyping processes can be divided into two groups: laser-based processes and processes without use of a laser. One approach is stereolithography (SLA) where a liquid composition of a radiation-curable polymer is hardened layer-by-layer by using a laser. If color is desired on a workpiece produced by SLA, the piece is then subsequent colored on the surface. This is complicated and time-consuming. Another process is Selective Laser Sintering (SLS), in which, by analogy with the SLA, a pulverulent raw material, e.g. a thermoplastic or a sinterable metal, is sintered selectively layer-by-layer by a laser. Again, the first step of this process can only produce single-color, or non-specifically colored, 3D objects. The same issue applies to coloring in a third laser-based process, "laminated object manufacturing", in which layers of a paper web or plastics foil provided with adhesive are adhesive-bonded to one another and cut by a laser. One example of subsequent coloring of an object is described in U.S. Pat. No. 6,713,125.

A conventionally known 3D printing process which can also be used for the production of color objects is the UV ink-jet process. In this three-stage process, a pulverulent material is applied in thin layers, a UV-curable liquid is printed in the form of the respective layer of the subsequent three-dimensional product onto the said layers, and finally the printed layer is hardened by using a UV source. These steps are repeated layer-by-layer.

In WO 2008/077850 variously colored liquids are provided with hardener that are mixed in a chamber directly upstream of the printing process. Selective coloring is thus possible. However, no sharp color transitions are possible, because of the mixing chamber. This type of process moreover lacks sharpness at the limits of the hardening process, and this can reduce surface smoothness, and can sometimes lead to non-uniform coloring. In WO 2001/26023, two printing heads are described with variously colored hardener compositions, giving different elasticity properties in the products. However, the number of colors described is not more than two.

In a process in accordance with WO 2009/139395, similar to 3D ink-jet printing, a colored liquid is applied layer-by-layer and printed selectively with a second liquid which leads to a curing reaction with the first liquid. This type of process can only produce a structure of layer-by-layer colors, except in so far as mixing can occur between the uncured layers of liquid.

In a process described in US 2004/0251574, the print of the thermoplastic is followed by selective printing with an ink. This process has the advantage of permitting highly selective printing. However, this process has the disadvantage that it is impossible to achieve uniform color definition or bright coloring, since there is no possibility of achieving uniform penetration of the ink into the composite made of the (ceramic) powder and of the binder.

In U.S. Pat. No. 6,401,002, various liquids are used with different inks and the binder. The said liquids are either applied separately dropwise or combined by way of connecting lines in a nozzle upstream of the dropwise application process. The person skilled in the art is aware that neither procedure gives ideal color definition. In the former, the mixing of the inks takes place in viscous liquids on the surface. This mixing is therefore rarely complete. In the second procedure, pressure differences in the connecting lines can lead to extreme color variation.

Among printing processes for the production of three-dimensional objects, the process that is most economical in use of materials and that is also most advantageous in terms of design of machinery is the fused deposition modeling (FDM) process. This involves an extrusion-based, digital manufacturing system. There are also other known processes that are substantially analogous with slight differences, for example fused filament fabrication (FFF), melted extrusion manufacturing (MEM) or selective deposition modeling (SDM). In the FDM method, two different polymer filaments are melted in a nozzle and are printed selectively. One of the materials involves a support material which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer. The FDM process was first described in U.S. Pat. No. 5,121,329. Coloring is mentioned in general terms in US 2002/0111707, but is not described in any detail. In the 3D color-printing method in accordance with U.S. Pat. No. 6,165,406, separate nozzles are used for each individual ink. There are therefore only very restricted possibilities for ink mixing, and the color effect achieved becomes very simple. In the FDM variant described in U.S. Pat. No. 7,648,664, variously colored build materials are used in granulate form, melted separately from one another, and mixed with one another in accordance with color requirement by an intervening extruder, before application as print. This method requires very complicated apparatus, and many advantages of FDM are lost. U.S. Pat. No. 6,129,872 describes a process in which the build material is melted in a nozzle and various colorant mixtures are metered selectively into the melt at the end of the nozzle. However, this leads to inadequate mixing and does not give clean color definition.

US 2010/0327479 describes a process in which a plurality of colored filaments are combined in a microextruder and are continuously extruded therein to give a new colored filament, which is then passed onward into the printing head for application as print. This process requires very sophisticated and complicated apparatus. The achievable color range is moreover subject to restriction resulting from the number of filaments. In an alternative embodiment, the variously colored filaments can also be conducted directly into the printing head, and mixed there.

United States Patent Application 20140134334 discloses a 3D extrusion print process for producing multicolored three-dimensional objects. The process is based on coating, upstream of the printing head, of the polymer strand used for producing the actual object, and on fixing of the coating upstream of entry of the polymer strand into the printing head. Downstream of the extrusion process in the printing head, the coating remains predominantly at the surface of the extruded strand.

SUMMARY

A three-dimensional (3D) continuous color printer includes one or more cartridges each with a building material stored therein, a mixer coupled to each cartridge, and a single printhead coupled to a mixer output, wherein the building material stored in the cartridge is transported to the mixer and the single print head to form a continuous color object.

Implementations of the above aspects can include one or more of the following. Preferably four cartridges are connected with tubes to the mixer in order for building materials in different colors to mix well along the way to the print head module. The mixer can be a five-way connector (or a connector with a different number of open-ends). Alternatively, a static mixer (like an in-line mixer) or an active mixer can serve as the core component of the mixer. The material of the connector can be plastic, metal or other material as long as it is liquid sealed. The color flowing out from one-end of the connector is determined by the relative flow rates of the incoming materials, which are in two (or more) colors. The flow rate from the one-end of the connector is a constant defined by users, no matter of which color the mixed material is flowing out. That is, the flow rates of incoming materials in various colors are preferably summed up to a user-defined constant, and the ratios between them give the color of outflowing material. The distance between the mixer and the print head module is a controllable factor when building the invention. When the path between the mixer and the print head module is short, the intervals between color transitions are shorter but materials have less time to mix along the shorter pathway. On the other hand, the color transition intervals are larger with a better mixing quality if the path between the mixer and print head module is larger. The tubes used to connect modules are sufficiently thin to minimize the delay between color transitions, and they should be long enough so that the motion of the nozzle is not confined. This mixer can be designed to be disposable in order to maintain the quality of printing.

The print head module takes in building material and extrudes it to print 3D objects, and the dimension of the print head tip can define the resolution of printed objects. Some choices of print head include but not limit to needle, nozzle, or ball-pen head. The print head can be replaceable or changeable according to materials choice, resolution requirement, or clogging prevention. In some embodiments, the print head module can have a capability of mixing building materials. For example, a static mixing nozzle can be utilized as a print head module which can mix incoming building materials and extrude it. A static mixing nozzle can mix the solution at an affordable cost, and the inner diameter of the nozzle tip should be optimized between a large one (which decreases the probability of clogging) and a small one (which increases the precision of the printing).

The building materials utilized in the invention can be silicon, silicone rubber, siliconized acrylic caulk, polyurethane, curable resin and alternatives include but not limit to a fluid or paste that can be solidified. The solidification process may involve radiation, cooling, or drying, but those procedures are optional. Materials that can dry spontaneously are also acceptable. Materials in two or more colors are used so that they can be mixed to form fluid in a desired color, and the building materials are colored with pigment soluble in the building material. Moreover, addition of particles, oil, water, or materials with different properties (called supplement material here) can alter the characteristics of the printed 3D objects, such as hardness, stiffness, or other physical or chemical properties.

In addition to heat generated from an electric heater, the building materials which may also include additives, adhesion promoters or adhesives, can be activated and/or can be heated by microwaves or by magnetic or electric fields. The additives may have been added either to one composition or to all of the compositions, or may be added from separate feed containers. In the latter case, the compositions are colorless. For example, one or more syringes can add crosslinking agents, initiators or accelerators which through contact with the building material, through reaction with one another in the mixture, or through thermal or other activation of the reaction in the fixing unit and/or downstream of the extrusion process, lead to a reaction, for example addition reaction or crosslinking, thus giving a three-dimensional object which entirely or to some extent has the properties of an elastomer or of a thermoset. The person skilled in the art arrives at the specific selection of the appropriate additives by considering the composition and the build material used.

Advantages of the system may include one or more of the following. The system can produce three-dimensional color objects with continuous color. The use of a single print head decreases cost and increases reliability and enables high quality color renditions. The system produces mechanically stable, multicolored 3D objects. The material may contain any of colorants and functional additives.

DESCRIPTION OF THE PREFERRED EMBODIMENTS

Figure 1:
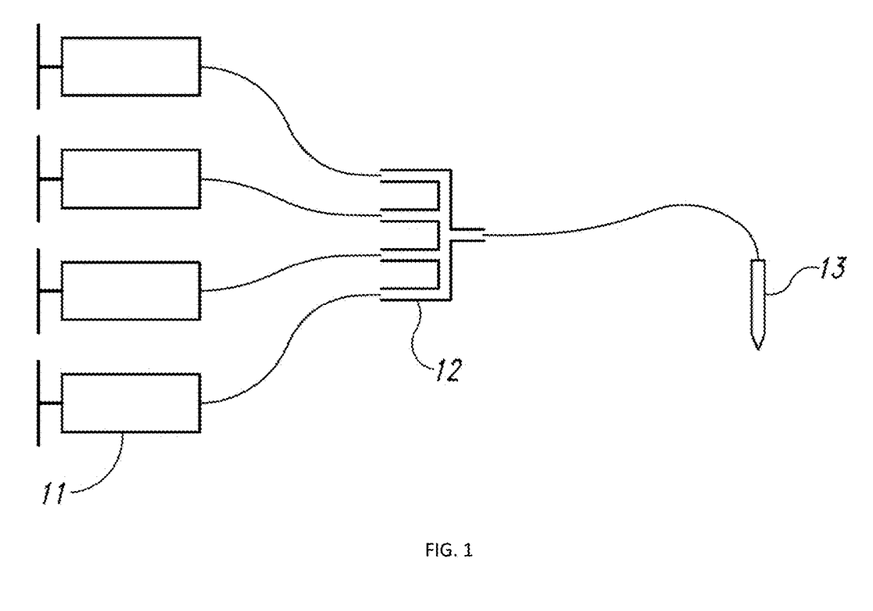
FIG. 1 is a schematic view of an exemplary 3D color printer.

The following description of preferred embodiments to build a color 3D printing device that utilizes solidifiable material as the building materials. In FIG. 1, the color 3D printing system includes a plurality of building material cartridges 11, a mixer 12, and a print head 13 with a single heat extruder. Solidifiable building materials stored in the cartridge 11 are subsequently transported to the print head 13, mixed well along the pathway, and extruded from the tip. The extruded droplet of liquid building material is solidified.

Each cartridge 11 stores building materials before they get transported. More than one cartridges are used to store fluids in various properties (such as color, hardness, or density). In one embodiment, the building materials are stored as syringes to make the transportation of building material easy. Alternative storing devices can be tubes, bottles, or other liquid containers as long as the liquid inside can be transported out as requested. It is preferably a four-cartridge system: each cartridge has building materials of a color from red (or magenta), yellow, blue (or cyan), and white (or clear). Material in black (key) can be used to replace white/clear material so the system is similar to CMYK color system. However, three-cartridge system or a system with different number of cartridges is acceptable.

The system uses only a single extruder to provide energy for the melting. The single extruder deposits the mixed droplets to form a continuous full color object. In contrast, the conventional system with multiple extruders cannot provide continuous full color as each droplet is too large (much larger than the size of ink droplets in a desktop inkjet printers and the melted plastic cools down as soon as it touches the supporting bed and gets solidified. The single extruder approach can also handle melted thermoplastics, the common building material of different colors since they melt at above 200 degree Celsius.

Figure 2:
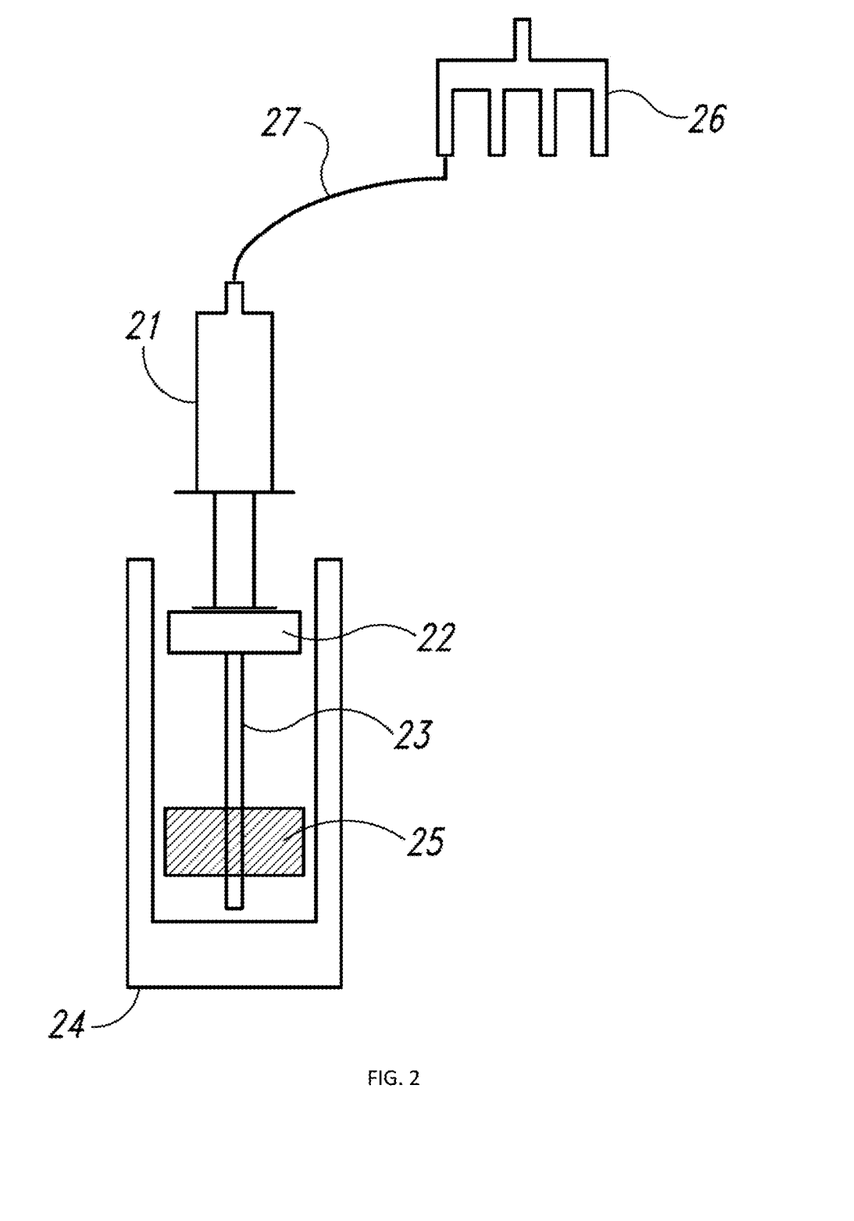
FIG. 2 is a front view of the cartridge system illustrating an exemplary mechanical system that transport building material from each syringe to a mixer.
Figure 3:
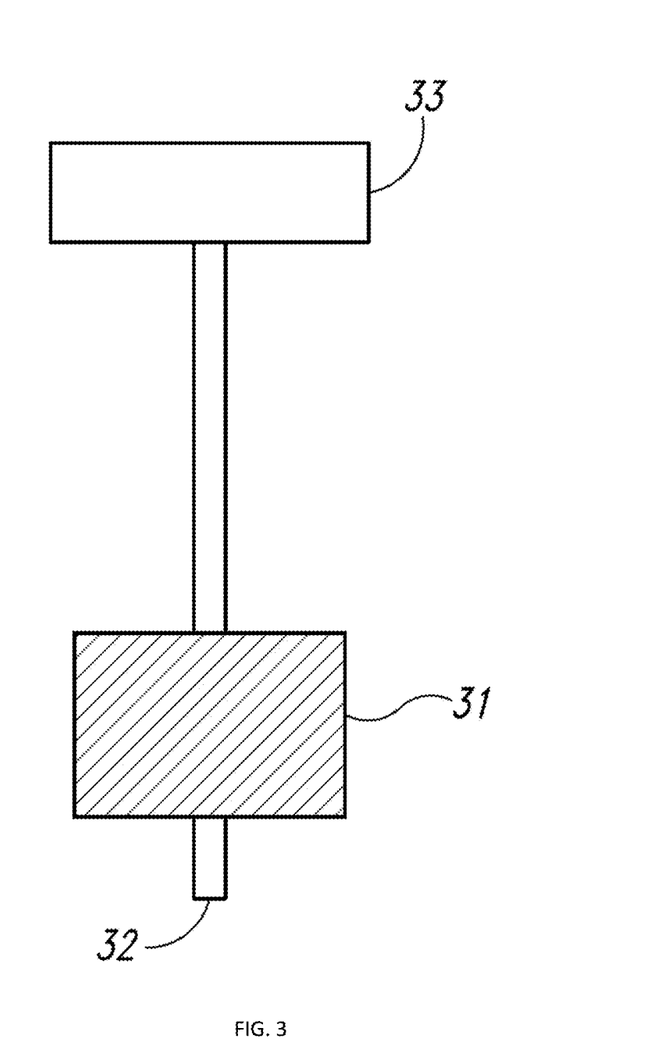
FIG. 3 is the top view of an exemplary bar that supports a syringe plunger in FIG. 2.

Viewing FIGS. 2 and 3 together, the building material in syringe 21 is ejected by a plunger of the corresponding syringe during extrusion. The syringe bottom contacts a bar-shape component 22 connected to a threaded rod 23. As detailed in FIG. 3, a pusher 33 is fixed to a threaded rod 32 and the rod is driven by a stepper motor 31. In FIG. 2, the bar 22 and the plunger move along the guide 24 as the threaded rod is rotated by the stepper motor 25, which is capable of rotating by a small angle so the plunger moves incrementally, resulting in small volume of building material transported.

Preferably four cartridges are connected with tubes to the mixer in order for building materials in different colors to mix well along the way to the print head module. The mixer can be a five-way connector (or a connector with a different number of open-ends). Alternatively, a static mixer (like an in-line mixer) or an active mixer can serve as the core component of the mixer. The material of the connector can be plastic, metal or other material as long as it is liquid sealed. The color flowing out from one-end of the connector is determined by the relative flow rates of the incoming materials, which are in two (or more) colors. The flow rate from the one-end of the connector is a constant defined by users, no matter of which color the mixed material is flowing out. That is, the flow rates of incoming materials in various colors are preferably summed up to a user-defined constant, and the ratios between them give the color of outflowing material. The distance between the mixer and the print head module is a controllable factor when building the invention. When the path between the mixer and the print head module is short, the intervals between color transitions are shorter but materials have less time to mix along the shorter pathway. On the other hand, the color transition intervals are larger with a better mixing quality if the path between the mixer and print head module is larger. The tubes used to connect modules are sufficiently thin to minimize the delay between color transitions, and they should be long enough so that the motion of the nozzle is not confined. This mixer can be designed to be disposable in order to maintain the quality of printing.

The print head module takes in building material and extrudes it to print 3D objects, and the dimension of the print head tip can define the resolution of printed objects. Some choices of print head include but not limit to needle, nozzle, or ball-pen head. The print head can be replaceable or changeable according to materials choice, resolution requirement, or clogging prevention. In some embodiments, the print head module can have a capability of mixing building materials. For example, a static mixing nozzle can be utilized as a print head module which can mix incoming building materials and extrude it. A static mixing nozzle can mix the solution at an affordable cost, and the inner diameter of the nozzle tip should be optimized between a large one (which decreases the probability of clogging) and a small one (which increases the precision of the printing).

The building materials utilized in the invention can be silicon, silicone rubber, siliconized acrylic caulk, polyurethane, curable resin and alternatives include but not limit to a fluid or paste that can be solidified. The solidification process may involve radiation, cooling, or drying, but those procedures are optional. Materials that can dry spontaneously are also acceptable. Materials in two or more colors are used so that they can be mixed to form fluid in a desired color, and the building materials are colored with pigment soluble in the building material. Moreover, addition of particles, oil, water, or materials with different properties (called supplement material here) can alter the characteristics of the printed 3D objects, such as hardness, stiffness, or other physical or chemical properties.

Other than solidification caused by temperature change, the building materials which may also include additives, adhesion promoters or adhesives, can be activated and/or can be heated by microwaves or by magnetic or electric fields. The additives may have been added either to one composition or to all of the compositions, or may be added from separate feed containers. In the latter case, the compositions are colorless. For example, one or more syringes can add crosslinking agents, initiators or accelerators which through contact with the building material, through reaction with one another in the mixture, or through thermal or other activation of the reaction in the fixing unit and/or downstream of the extrusion process, lead to a reaction, for example addition reaction or crosslinking, thus giving a three-dimensional object which entirely or to some extent has the properties of an elastomer or of a thermoset. The person skilled in the art arrives at the specific selection of the appropriate additives by considering the composition and the build material used.

Figure 4:
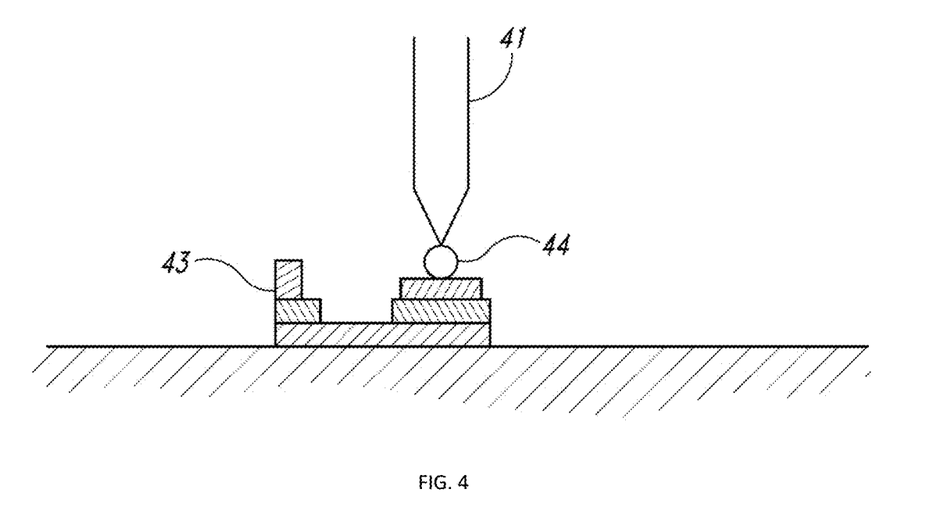
FIG. 4 is a schematic picture of an exemplary printing process using the system of FIG. 1.

As shown in FIG. 4, the printing process involves the print head of the nozzle (41), a supporting bed (42), and building material coming from the nozzle 13. The building material, which is paste-like in one embodiment, comes from the nozzle droplet by droplet 44, and it starts to solidify. The solidification rate is controlled so that a droplet is almost solidified when making a contact with the bed or the object below 43 but the material coming right out from the print head remains liquid so the head would not be clogged by materials.

A surface coating may also be added and a reaction can take place subsequently, in that additives activatable by means of microwaves, heat, plasma, UV light or magnetic fields are first applied as coating, and these are appropriately activated in a following step. A particularly advantageous reaction occurs on the surface of the extruded materials, and in particular may also be utilized for the crosslinking of the strands to one another. However, this subsequent crosslinking may also be brought about within the former filaments by diffusion or by an additional dynamic or static mixer unit, already described above, in the region of the printing head in which the molten building material is present.

In an alternative embodiment, the additives from various syringes may themselves react with one another after the mixing process and thus give chemical crosslinking to catalyze solidification and/or improve the adhesion that the building materials downstream of the printing process exhibit towards one another.

In another embodiment, downstream of the printing process one or more coating constituents can be deposited on the surface of the resulting object.

The system can stand alone or be integrated with other system. For example, a hand-held color 3D printer embodiment allows users to print 3D objects in various colors on a surface, in the air, or in solution. Alternatively, the system can be mounted on an existing 3D printer to convert the conventional printer into a multi-color 3D printer.

Figure 5:
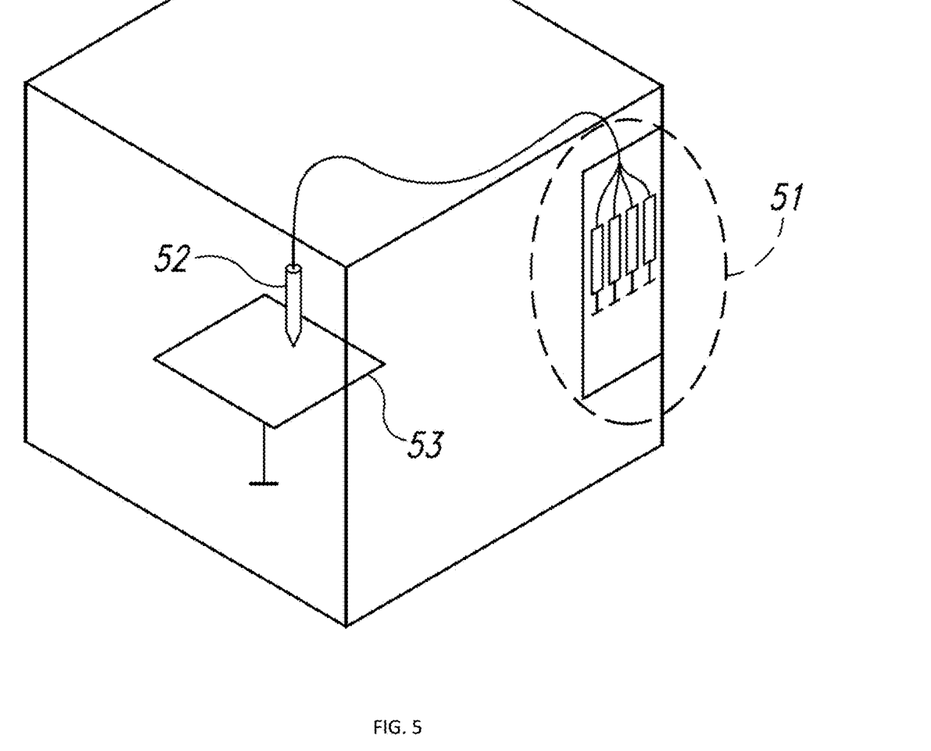
FIG. 5 shows an exemplary system with a 3D moving stage to form a 3D object.

In another embodiment shown in FIG. 5, the cartridge module and mixer 51 are fixed with respect to the framework of a 3D printer, while the print head module 52 is moveable. A supporting bed 53 is used to support the printed 3D object.

Figure 6:
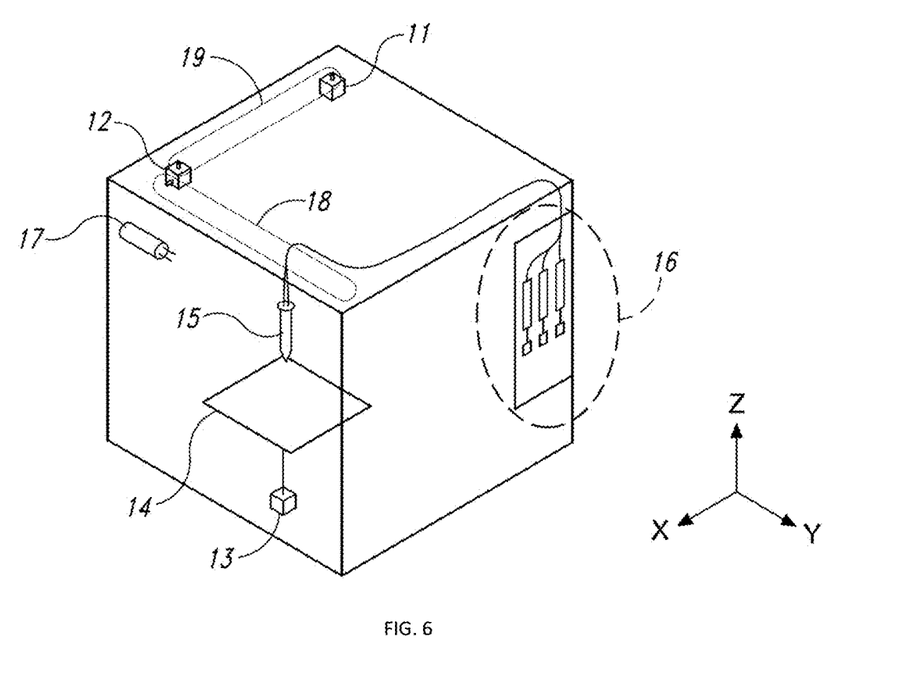
FIG. 6 shows another embodiment of a 3D color printer.

FIG. 6 shows another embodiment of a 3D color printer. In FIG. 6, the color 3D printer consists of a mechanical system that precisely defines the relative positions of the extruding nozzle 15 and the supporting bed 14, a light system that used to cure polymers 17, and a extrusion system that prints objects. Curable building materials stored in the cartridges 16 are transported to the nozzle, mixed well along the pathway, and extruded from the tip. The extruded droplet of liquid building material is solidified on the supporting bed as shined by the radiation. As the nozzle is moving, the droplet can be printed to any place on the bed, so the structure of printed material can be determined. The mechanical system controls the positions of the nozzle and the supporting bed with preferably three motors. The supporting bed is merely a support to solidified objects. It can be made of metal or plastics and some coatings may be applied to the surface to create an optimal binding force between the bed and the printed objects. The nozzle is fixed to the y-axis belt controlled by a y-axis motor in the way that the nozzle is moving along the y-axis as the y-axis motor spins. The y-axis belt may be supported by rods along the y-axis in order to increase its robustness. The y-axis belt is then fixed to a wheel on the x-axis belt so the whole y-axis belt can move along the x-axis according to the x-axis motor. The belt system controlled by the two motors decides the x and y positions of the nozzle while the height of it remains a constant. The z-position of the supporting bed is maneuvered by the z-axis motor, which is done in the way that the motor is connected concentrically to a threaded rod, coupled to the supporting bed so that the bed moves along the threaded rod (the z-axis) as the motor spins. The motors used in the mechanical system are preferably stepper motors to have a small increment when they spin, so the position of the nozzle can be precisely defined.

The power of movements is provided and translated by motors and belts in the example, but gear systems or robotic arms may be included as an alternative. A calibration device may be used to precisely determine the positions of the components, and it can include but not limited to the following, collision sensors, IR sensors, or labeled tracks. Taking the collision sensors as an example, the nozzle will move towards the boundary of the X- and Y-axes until it hits the sensor. This point is defined as the origin, and the coordinate of the nozzle can be tracked by recording the angle rotated for the stepper motors.

The building material utilized in the embodiment of FIG. 6 can be light-curable resins, and alternatives include but not limit to fluids that can be solidified as radiated, cooled, or dried. Materials in three or more colors are used so that they can be mixed to form homogeneous fluid in a desired color, and they are colored with pigment that can be dissolved in the building material before being filled in the cartridges. As the common light curable material is a polymer, these pigments are preferably oil-dissolved. The light system includes a radiation source to solidify the building material extruded from the nozzle and the solidified droplet can be attached to the supporting bed or the object below that has been built. A radiation source is utilized to solidify light-curable resin, and possible options include but not limited to UV, visible light, and laser. The geometric relationship between the light source and a printed object can vary. The light focuses on the spot of the printed droplet, or shines on the whole supporting bed from the top, or shines from the bottom to allow fluid be solidified on the bed. The radiation source may be controlled to switch on and off or move during the process of printing.

The extrusion system of FIG. 6 includes a mixing nozzle and a cartridge system. The nozzle is fixed to a wheel on the y-axis belt so it is able to move within the X-Y plane. A tube is connected to the nozzle in order to allow building material to flow into the nozzle, well mixed and extruded. A static mixing nozzle is preferably used to mix the solution at an affordable cost, and the inner diameter of the nozzle should be optimized between a large one (which decreases the probability of clogging) and a small one (which increases the precision of the printing). The tube used is sufficiently thin to minimize the delay between color transitions, and they should be long enough so that the motion of the nozzle is not confined.

Next, the cartridge system is detailed. Several cartridges to store fluids in different colors are included in the invention and these storing devices can be syringes, bottles, or other liquid containers as long as the liquid inside can be transported out as requested. It is preferably a four-cartridge system: each cartridge has the building materials of a color from red, yellow, blue, and white (clear). In the example provided, syringes are preferably used to make the transportation of building material easy. The syringe should be covered with light blocks, such as dark sheets or a lightproof box to prevent building materials from the exposure of radiation, which causes solidification. Three cartridges are connected with soft tubes to a many-to-one adaptor (such as 3 to 1 adapter) in order for building materials in different colors to mix well along the way to the nozzle. The material of the adaptor can be plastic or metal as long as it is liquid sealed. The color flowing out from one-end of the adaptor is determined by relative flow rates of the three incoming materials, which are in three element colors. The flow speed from the one-end is a constant defined by users, no mater of which color the mixed material is flowing out. That is, the flow rates of materials in three colors are preferably summed up to a user-defined constant, and the ratios between them give the color of outflowing material. The distance between the adaptor and the extruding nozzle is a controllable factor when building the invention. When the path between the adaptor and the nozzle is short, the intervals between color changes are shorter but materials have less time to mix along the shorter pathway. On the other way, the color change intervals are larger with better mixing quality if the path between them is larger. The movements of building materials are driven by the plunger of the corresponding syringe during extrusion, whose bottom is fixed to a bar-shape component coupled to a threaded rod and a thin rod. In one embodiment, the bar has a hole for the rod and a hex nut embedded for coupling to threaded rod. The material used for the bar should be sufficiently strong to prevent bending as the bar moves along the rod. A bushing may be fixed in the hole to have a smoother motion of the bar along the thin rod. The bar and the plunger move along the vertical axis as the threaded rod is rotated by the stepper motor, which is capable of rotating by a small angle so the plunger moves incrementally, resulting in small volume of building material transported.

The printing process involves the print head of the nozzle, a supporting bed, and a radiation source. Building material, light curable resin preferably, comes from the nozzle droplet by droplet, and it starts to solidify as exposed to a radiation. The solidification rate is controlled so that a droplet is almost solidified when making a contact with the bed or the object below but the material coming right out from the print head remains liquid so the head would not be clogged by materials. The object is printed layer by layer: the nozzle would move horizontally in the X-Y plane to print material, and then the supporting bed would move downward along the z-axis by a thickness of a layer (a user defined factor) followed by a same printing process within the new X-Y plane.

Figure 7:
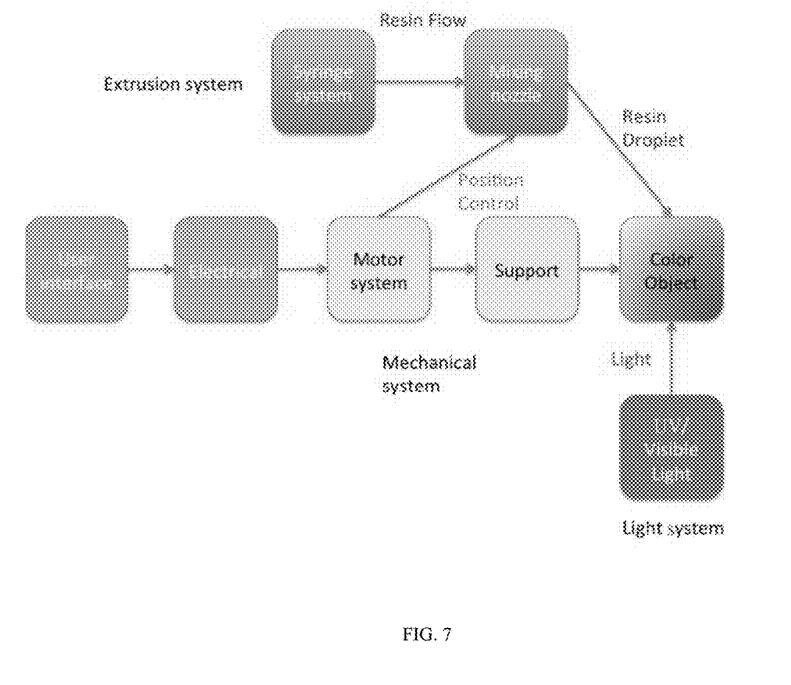
FIG. 7 shows an exemplary 3D color printing process.

FIG. 7 shows an exemplary 3D color printing process. In FIG. 7, the schematic flow chart of the process to build color objects with the above embodiments is presented. Users first provide some inputs to the invention, while the user interface for inputs can be a software interface on a computer/smartphone that can communicate with the invention, or a built in interface to load data on portable storage devices like SD cards or flash drives. Upon receiving the data from the user-end, the electrical system controls the cartridges and mechanical systems in order to transport building materials from the cartridges to the nozzle while the print head is moving across the supporting bed and print color objects. A radiation source that solidifies the building materials on the supporting bed is included in the light system.

Figure 8:
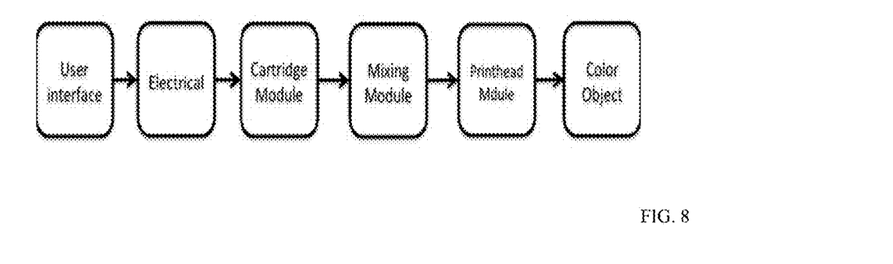
FIG. 8 is an exemplary flow diagram of the process to build color objects with the invention

In FIG. 8, a schematic flow chart of the process to build color objects by applying the above system is presented. Users first provide some inputs to the invention, while the user interface for inputs can be a software interface on a computer/smartphone/tablets or any device that can communicates with the invention, or alternatively a built in interface to load data on portable storage devices like SD cards or flash drives. Upon receiving the data from the user-end, the electrical system controls the cartridge module in order to transport building materials from the cartridge module to the print head module while getting mixed by the mixer along the way.

An application of this invention is to print anatomical models. The 3D printer can be loaded with digital file (*.STL, CT images, or others), and anatomical models can be constructed accordingly. Since the materials used in the system is soft and flexible, the printed models are more similar to real organs in terms of feeling, texture, and imaging results (such as ultrasonic imaging). The printed models can be used as educational tools, surgical simulation, or other medical applications.

An alternative application of the system is a multi-material 3D printer. Each cartridge can hold different building materials, so the printer can print objects with one of the materials in cartridges or a mixture of them (some or all materials). If the machine is used to print organ models, materials with various properties (such as densities, colors, or hardness) can be used to mimic an organ with several parts.

While the building materials utilized in the preferred embodiment can be silicon, silicone rubber, siliconized acrylic caulk, polyurethane, curable resin and alternatives include but not limit to a fluid or paste that can be solidified by having the mixing chamber 12 heated to a suitable temperature and delivered to the print head as melted thermoplastically processable material. In this alternative embodiment the build material may comprise acrylonitrile-butadiene-styrene terpolymer (ABS), polycarbonate (PC), poly(meth)acrylate, polyphenylene sulfone (PPSU), HDPE, polyetherimide (PEI), polyether ether ketone (PEEK), polylactic acid (PLA) or a mixture of at least two of these polymers, or a mixture composed of at least 50% by weight of one of the polymers. The term (meth)acrylate here means either methacrylate, e.g. methyl methacrylate, ethyl methacrylate, etc. or acrylates, e.g. ethylhexyl acrylate, ethyl acrylate, etc., or else a mixture of the two. In relation to the second, optional build material from the third nozzle, preference may be particularly given to polymethacrylate or polycarbonate. In relation to the support material from the first printing head, the system can use an acid-, base- or water-soluble polymer.

In another embodiment, a 3D extrusion printer can have a printing head with a nozzle for applying a build material as print; a filament stream supplied to the printing head to be melted and provide the build material; a coating unit upstream to the printing head on the filament stream; a fixing region located between the coating unit and the printing head; and a plurality of feed containers equipped with metering devices to supply a coating composition with one or more additives and an ink to the melted filament before entering the printing head. A mixing unit can be placed between the melter 12 and the print head 13 where the melted composition is mixed prior to being fed to the print head. The printing head can be a static mixer in a lower region of the nozzle. The build material is not colored and is non-transparent.

Feed containers with pigments containing color pigment in addition to black and to the inks and/or primary colors or additives. The pigments can be a metallic pigment or a fluorescent pigment can be used. Sensors can be provided to measure the flow of materials to the mixer and optimized with that information for color monitoring and print control.

In other embodiments, in place of the syringes, the system can use movable cartridges known for color printing such as for 2D color ink-jet printers, or involve feed vessels from which liquids are removed by pumping, or involve cartridges which can be clamped into a reciprocating pump. The design of these may be such that they can be replaced or renewed simply and individually.

The system can be used in an extrusion-based 3D printing is designed such that the respective color shade is input into a CAD program, and that a file is provided which comprises, in addition to the coordinates, the color information for the manufacturing process and for regulation of the formulation of materials and of colorants. An example of a suitable file format is described in Additive Manufacturing File Format (ASTM F2915-12). The respective color shade may be established by regulating the metering devices and by controlled metering of the respective primary colors and, respectively, black from the feed containers into the system.

Another embodiment works with Autodesk's Spark which connects digital information to 3D printers in a streamlined way, making it easier to visualize and optimize prints without trial and error, while broadening the range of materials used for printing. The system with Spark's software platform for 3D printing is enables interoperability of software, hardware and material suppliers. The Spark platform is open, so hardware manufacturers, app developers, product designers can use its building blocks to further push the limits of 3D printing.

A number of preferred parameter values have been given for the various embodiments described herein. However, further parameter values can be derived by one of skill in the art based on the teachings herein and the building of sample objects.

Even though the embodiments of this disclosure have been directed toward obtaining cure parameters through data processing, this only represents one approach to causing appropriate transformation of material in association with each layer. Therefore, the data processing terminology should be interpreted to include any means for modifying original object descriptive parameters that result in the transformation of material according to the teaching of this invention. The teachings of this invention relate to interpreting object descriptive parameters and reproducing the object in a manner which deviates from a strict layer by layer formation, as necessary to achieve a higher accuracy reproduction. The methods and apparatus of this invention lead to higher accuracy reproductions by utilization of the simultaneous multiple layer curing techniques disclosed herein.

Thus, while several embodiments have been shown and described, it will be obvious that many changes and modifications may be made thereunto, without departing from the spirit and scope of the present invention.

What is claimed is:

1. A three-dimensional printer, comprising:
   a plurality of cartridges comprising building materials stored therein, wherein the building materials comprise liquids, wherein the building materials have different properties, and wherein the building materials are not additives for imparting the different properties;
   a mixer coupled to each of the plurality of cartridges; and
   a single print head comprising an extruder coupled to an output of the mixer for printing a three-dimensional (3D) object, wherein the single print head is not a 3D inkjet printer;
   wherein the building materials stored in the plurality of cartridges are transported to the mixer to generate a mixture, and
   wherein the single print head is configured to use the mixture generated from the building materials to extrude at least a portion of the mixture to print at least a portion of the 3D object with characteristics that are altered, wherein the characteristics include stiffness or hardness.

2. The three-dimensional printer of claim 1, wherein the plurality of cartridges comprises a syringe.

3. The three-dimensional printer of claim 1, wherein the plurality of cartridges comprises four cartridges connected with tubes to the mixer to mix building materials in different colors during transport to the print head.

4. The three-dimensional printer of claim 1, further comprising a multi-way connector or a connector with a different number of open-ends coupled to the mixer.

5. The three-dimensional printer of claim 4, wherein flow rates of incoming materials with a plurality of colors are summed up to a predefined constant, and ratios between flow rates provide a color of outflowing material to the single print head.

6. The three-dimensional printer of claim 1, wherein the mixer comprises a static mixer, an in-line mixer, or an active mixer.

7. The three-dimensional printer of claim 1, further comprising a pathway between the mixer and the print head to set intervals between color transitions.

8. The three-dimensional printer of claim 1, wherein a path between the mixer and print head module is of a length for increased color transition intervals.

9. The three-dimensional printer of claim 1, wherein the print head is replaceable or changeable according to materials choice, resolution requirement, or clogging factor.

10. The three-dimensional printer of claim 1, wherein the print head comprises a needle, nozzle, or ball-pen head.

11. The three-dimensional printer of claim 1, wherein the building materials comprise one of: silicon, silicone rubber, siliconized acrylic caulk, polyurethane, curable resin and a solidifiable fluid or paste having a liquid state to mix color.

12. The three-dimensional printer of claim 1, further comprising tubes that connect modules, each with a predetermined internal diameter to minimize a delay between color transitions.

13. The three-dimensional printer of claim 1, wherein the building materials are solidified through exposure to radiation, cooling, or drying.

14. The three-dimensional printer of claim 1, further comprising a lighting unit that is configured to irradiate building materials.

15. The three-dimensional printer of claim 1, wherein the print head is configured to move along an x-axis and a y-axis, and a support is configured to move along a z-axis orthogonal to a plane having the x-axis and y-axis, wherein the 3D object is printed on the support.

16. The three-dimensional printer of claim 1, wherein the mixer is part of a pathway that is in fluid communication with the single print head.

17. The three-dimensional printer of claim 1, wherein the mixer is part of the single print head.

18. The three-dimensional printer of claim 1, wherein the different properties are different colors.

19. The three-dimensional printer of claim 1, wherein the different properties are different viscosities.

20. The three-dimensional printer of claim 1, wherein the mixture is generated in the absence of melting the building materials.

21. The three-dimensional printer of claim 1, wherein the building materials comprise polymeric materials in a liquid state.

* * * * *